United States Patent
Christe et al.

(10) Patent No.: US 6,623,718 B1
(45) Date of Patent: Sep. 23, 2003

(54) PROCESS FOR THE CHEMICAL GENERATION OF SINGLET DELTA OXYGEN

(75) Inventors: Karl O. Christe, Calabasas, CA (US); Angelo J. Alfano, Westlake Village, CA (US)

(73) Assignee: ERC Incorporated, Huntsville, AL (US)

( * ) Notice: Subject to any disclaimer, the term of this patent is extended or adjusted under 35 U.S.C. 154(b) by 95 days.

(21) Appl. No.: 10/022,318

(22) Filed: Dec. 15, 2001

(51) Int. Cl.⁷ .............................................. C01B 13/00
(52) U.S. Cl. ...................................................... 423/579
(58) Field of Search ......................................... 423/579

(56) References Cited

U.S. PATENT DOCUMENTS

| | | | | |
|---|---|---|---|---|
| 4,461,756 A | * | 7/1984 | Rockenfeller ................ | 423/579 |
| 5,378,449 A | * | 1/1995 | Dinges ........................ | 423/579 |
| 5,624,654 A | * | 4/1997 | Clendening et al. ......... | 423/579 |
| 6,165,424 A | * | 12/2000 | Clendening et al. ......... | 422/235 |

* cited by examiner

Primary Examiner—Stanley S. Silverman
Assistant Examiner—Maribel Medina
(74) Attorney, Agent, or Firm—Walter Unterberg

(57) ABSTRACT

This method generates the first electronically excited state of oxygen (singlet delta) at ambient temperature by a gas-solid chemical reaction involving a solid alkali metal peroxide or a solid alkaline earth peroxide and a non-radioactive-hydrogen-isotope halide gas. Singlet delta oxygen was produced from solid lithium peroxide, sodium peroxide or barium peroxide by reaction with gaseous hydrogen chloride, hydrogen bromide, deuterium chloride, or deuterium bromide. The method can be practiced in a static or a flow system, and the reaction may take place in a chemical oxygen-iodine laser. The described process avoids unstable precursors, such as basic hydrogen peroxide, and liquid phase quenching. The method is safe, compact, solvent-free, mechanically simple, requires no external energy source, and permits the generation of large quantities of singlet delta oxygen. Furthermore, since no liquid phase separations are required the process is ideally suited for zero gravitational force conditions.

25 Claims, No Drawings

PROCESS FOR THE CHEMICAL GENERATION OF SINGLET DELTA OXYGEN

BACKGROUND OF THE INVENTION

1. Field of the Invention

The present invention relates to an improved method of chemically generating singlet delta oxygen. It particularly relates to a gas-solid reaction involving a hydrogen halide gas or deuterium halide gas and a solid alkali metal peroxide or solid alkaline earth peroxide.

2. Related Art

The singlet delta ($^1\Delta g$) state of oxygen, its first electronically excited state, lies 7874 cm$^{-1}$ (1.27 microns) above the triplet sigma ground state. Singlet delta oxygen was first discovered in 1924 and has found wide application as an oxidizer[1,2] and energy transfer agent[3,4]. Its role in biological processes[5] (cell/tissue destruction, aging and cancer inducing processes), synthetic organic chemistry[1,2], airborne environmental and waste treatment chemistry, and the chemical oxygen iodine laser (COIL)[3,4,6] is well documented. A variety of methods have been used to produce singlet delta oxygen either from oxygen containing reagents or directly from oxygen. The documented reaction[6] used to produce singlet delta oxygen for the COIL is exemplified in equation (1):

$$2MOH + H_2O_{2(aq)} + Cl_2 \rightarrow O_2(^1\Delta g) + 2MCl + 2H_2O \quad (1)$$

M in equation (1) is an alkali metal or mixture[7] thereof The aqueous environment represented by equation (1) is known to deactivate the singlet delta oxygen by collisional quenching and methods for very rapid and efficient oxygen extraction are required for COIL applications[8]. The hazards associated with concentrated basic hydrogen peroxide are also a disadvantage common to all coil embodiments based upon equation (1) and these hazards necessitate considerations for reaction zone cooling and maximum peroxide utilization and regeneration[7,9-12].

A variety of chemical sources of singlet delta oxygen has been reported[13]. These are typically solution based reactions that include analogs of equation (1). The reaction between gaseous ozone and certain organic substrates in the gas phase leads to singlet delta oxygen formation[14]. However, this approach is of no practical value in view of the hazards and difficulties associated with producing and handling ozone. Preparative oxidation chemistry methods which utilize singlet delta oxygen are generally limited to substrates soluble in water or in a suitably modified solvent system.

Direct photophysical techniques[15] that generate singlet delta oxygen from ground state oxygen require high powered light sources and inconvenient, dangerous pressures (100 atm) in purely gaseous or gas-liquid systems. Microwave or rf discharge of oxygen-gas mixtures are reliable techniques[16,17] for producing singlet delta oxygen at low total pressures of ca. 5 torr. A number of possibly undesirable species, including oxygen atoms, are also formed in the discharge process.

References Cited

1. A. A. Frimer and L. M. Stephenson. The singlet oxygen ene reaction, in Singlet O$_2$, Vol. 2, A. A. Frimer, ed., CRC Press, Boca Raton, Fla., 1984. Ch. 3.
2. R. F. Gould, ed., Oxidation of organic compounds, Vol. 3, Ozone chemistry, photo and singlet oxygen and biochemical oxidations, Advances in Chemistry, Vol. 77 (American Chemical Society, Washington, D.C., 1969.
3. W. E. McDermott, N. R. Pchelkin, D. J. Benard, and R. R. Bousek, An electronic transition chemical laser., Appl. Phys. Lett. 32, 469 (1978).
4. D. J. Benard, W. E. McDermott, N. R. Pchelkin, and R. R. Bousek, Efficient operation of a 100-W transverse-flow oxygen-iodine laser., Appl. Phys. Lett. 34, 40 (1979).
5. A. U. Khan, The discovery of the chemical evolution of singlet oxygen., Int. J. of Quantum Chem. 39, 251 (1991).
6. R. I. Wagner, Singlet delta oxygen generator and process., U.S. Pat. No. 4,310,502, Jan. 12, 1982.
7. C. W. Clendening, W. D. English, M. H. Mach, and T. D. Dreiling, Gas generating system for chemical lasers., U.S. Pat. No. 5,624,654, Apr. 29, 1997.
8. R. A. Dickerson, Singlet delta oxygen generator., U.S. Pat. No. 5,516,502, May 14, 1996.
9. J. D. Rockenfeller, Singlet delta oxygen generator., U.S. Pat. No. 4,461,756, Jul. 24, 1984.
10. W. L. Dinges, Formation of basic hydrogen peroxide., U.S. Pat. No. 5,378,449, Jan. 3, 1995.
11. W. E. McDermott, Singlet delta oxygen generator and process., U.S. Pat. No. 5,417,928, May 23, 1995.
12. D. G. Beshore and D. Stelman, Salt free lithium hydroxide base for chemical oxygen iodine laser., European Patent EP 0 819 647 A2, Jan. 21, 1998.
13. R. W. Murray, Chemical sources of singlet oxygen, in Singlet Oxygen H. H. Wasserman and R. W. Murray, ed., Academic Press, New York, N.Y., 1979, Ch. 3.
14. W. C. Eisenberg, K. Taylor, and R. W. Murray, Gas-phase generation of singlet oxygen by reaction of ozone with organic substances., J. Am. Chem. Soc. 107 8299 (1985).
15. W. C. Eisenberg, Atmospheric gas phase generation of singlet delta oxygen., in Advances in Oxygenated Processes, Vol. 3, pages 71–113, A. L. Baumstark, ed., JAI Press Inc., 1991.
16. S. M. Anderson, J. Morton, K. Mauersberger, Y. L. Yung, and W. B. DeMore, A study of atom exchange between O$_2$($^1\Delta$) and ozone, Chem. Phys. Lett. 189 581 (1992).
17. J. Schmiedberger and H. Fujii, Radio-frequency plasma jet generator of singlet delta oxygen with high yield, Appl. Phys. Lett. 78, 2649 (2001).

OBJECTS OF THE INVENTION

It is, therefore, an object of this invention to provide a technique that produces singlet delta oxygen in high yield from readily available starting materials in a minimally quenching environment without the need for external electrical, optical, or thermal energy.

Another object is to provide a safe method that avoids the use of dangerous, explosive chemicals such as basic hydrogen peroxide.

Yet another object is to provide a process that avoids the need for separating gases from a liquid phase thus rendering it suitable for zero gravity conditions.

A further object is to provide a lightweight, readily scalable, and mechanically simple method that avoids the use of heavy complex machinery, such as vortex mixers, centrifuges, and vacuum pumps to extract excited state oxygen from solution.

SUMMARY OF THE INVENTION

To implement the objects stated above, the method of the present invention was devised in which singlet delta oxygen is generated by a chemical reaction at ambient temperature of a solid peroxide with a hydrogen halide gas or a deuterium halide gas, without using external energy sources.

Singlet delta oxygen was produced from an alkali metal peroxide (such as lithium peroxide or sodium peroxide) or an alkaline earth peroxide (such as barium peroxide) in a reaction with a non-radioactive-hydrogen-isotope halide gas (such as hydrogen chloride, hydrogen bromide, deuterium chloride, or deuterium bromide). A static gas fill system was used and the results were observed by emission spectroscopy. Comparable results can be obtained in a flow system, and further, the reaction may take place in a chemical oxygen-iodine laser.

Accordingly, the present invention provides a safe, compact, lightweight, readily scalable, and highly efficient method for producing singlet delta oxygen from commercially available starting materials by directly reacting a solid peroxide with a non-radioactive-hydrogen-isotope halide gas. It avoids the use of unstable starting materials, such as basic hydrogen peroxide that can explode, and liquid phase quenching that can rapidly destroy most of the desired singlet delta oxygen. Furthermore, it avoids the need for a gas-liquid phase separation, thus making it ideal for space-based applications under zero gravity conditions.

DETAILED DESCRIPTION OF THE INVENTION

The present invention is the chemical generation of singlet delta oxygen by a gas-solid reaction at ambient temperature without external energy sources. A dry, solid alkali metal peroxide or solid alkaline earth peroxide is reacted with a dry hydrogen halide gas or a dry deuterium halide gas to form singlet delta oxygen. Alkali metal peroxides include lithium peroxide, $Li_2O_2$, and sodium peroxide, $Na_2O_2$; alkaline earth peroxides include barium peroxide, $BaO_2$. Non-radioactive-hydrogen-isotope halide gases include hydrogen chloride, HCl, hydrogen bromide, HBr, deuterium chloride, DCl, and. deuterium bromide, DBr.

All of these materials can be handled safely and are readily available commercially. Furthermore, the reactions of this invention do not require any external energy sources, such as photolysis, discharge, or heat. The desired singlet delta oxygen gas can be generated either in a static or a flow system. In a static system, a suitable peroxide is pressurized with a desired amount of the corresponding hydrogen halide gas or deuterium halide gas, resulting in continuous singlet delta oxygen evolution. In a flow system, a controlled stream of hydrogen halide gas or deuterium halide gas is passed either through a fixed bed of solid peroxide or introduced into a bed of fluidized peroxide, with the latter approach providing increased mixing, conversions, and space utilization. The resulting major products are solid metal halides, water vapor, and singlet delta oxygen gas, $O_2(^1\Delta g)$, as shown in equation (2) for the reaction of $Na_2O_2$ and HCl:

$$2Na_2O_2 + 4HCl \rightarrow 4NaCl + 2H_2O + O_2(^1\Delta g) \quad (2)$$

The preferred peroxides of our invention are alkali metal peroxides and, particularly, lithium peroxide, $Li_2O_2$, and sodium peroxide, $Na_2O_2$. However, other peroxides, such as alkaline earth peroxides, particularly barium peroxide, $BaO_2$, can also be used in place of the alkali metal peroxides. Further, the reaction may take place in a chemical oxygen-iodine laser.

Among the non-radioactive-hydrogen-isotope halides of our invention, HCl and HBr are preferred, with HBr producing the most intense singlet delta oxygen signals, followed by HCl. Since deuterated compounds quench singlet oxygen to a lesser extent than the corresponding hydrogen analogues, the use of DCl or DBr in place of HCl or HBr, respectively, is of particular interest for this invention.

Factors, such as solid surface area and dryness of the starting peroxide may affect these results.

EXPERIMENTAL PROCEDURE

The formation of singlet delta oxygen in our reactions was monitored by the observation of direct emission from the normally forbidden transition of singlet delta to ground state triplet sigma $O_2$ at 1.27 microns using a liquid nitrogen cooled InGaAs optical multichannel analyzer (OMA) after dispersion with an 0.3 meter spectrograph. The singlet delta oxygen emission signal obtained was identical in wavelength position and contour to that obtained from a microwave discharge of a helium-oxygen mixture at 4 torr and from a small sparger that reacted chlorine gas with basic hydrogen peroxide (BHP) according to equation (1). The sparger contained 100 cc of a mixture that was 7.5 M in $H_2O_2$ and 1.1 M in NaOH. The BHP was kept at −10 C and ca. 160 sccm of $Cl_2$ was bubbled through the liquid. A vacuum pump preceded by a liquid-nitrogen cooled trap extracted oxygen from the sparger at 6 torr total pressure. These two techniques are reliable standards for producing quantities of singlet delta oxygen that are readily observable by emission spectroscopy.

The following non-limitative examples illustrate the invention:

EXAMPLE 1

Hydrogen Chloride-Sodium Peroxide, HCl—$Na_2O_2$

A 7 inch path length cell made of 0.5 inch o.d. Pyrex glass with separate, side-mounted 0.25 inch diameter gas inlet and evacuation ports was used. This cell was terminated on one end with an O-ring joint that mated to a near infrared transmitting window with a 0.38 inch diameter clear aperture. The unthermostated cell contained 400 milligrams of sodium peroxide at room temperature and was slowly pressurized with hydrogen chloride gas up to 600 torr. The reaction cell was positioned with the window a few millimeters from the entrance slit of an 0.3 meter spectrograph with an InGaAs (−113 C) OMA mounted in the exit plane. The direct emission from $O_2$ singlet delta was readily observed in the 1.27 micron region both during the gas fill and after gas addition was stopped. The reaction was not violent but the cell pressure fell with time and the emission signal increased with added HCl pressure. Repeatedly pumping out and recharging the cell with HCl afforded approximately two hours of singlet delta oxygen emission from the same 400 milligram sodium peroxide sample. Signal collection times as short as one second were adequate for capturing clear $^1\Delta O_2$ emission spectra. The reaction product was a colorless solid.

EXAMPLE 2

Hydrogen Bromide-Sodium Peroxide, HBr—$Na_2O_2$

A 400 mg sample of $Na_2O_2$ was added to the unthermostated cell described in Example 1 and was slowly pressurized at room temperature with hydrogen bromide gas to 230 torr over a 9 minutes period. The reaction cell was positioned with the window a few millimeters from the entrance slit of an 0.3 meter spectrograph with an InGaAs (−113 C) OMA mounted in the exit plane. The direct emission from $O_2$ singlet delta was readily observed in the 1.27 micron region. Singlet delta oxygen emission signals were significantly stronger in this case than with HCl as the gaseous reactant and detector saturation resulted. The HBr/$Na_2O_2$ reaction was not violent. The cell was pumped out and recharged with HBr to 150 torr over an 8 minutes period and strong emission was observed at reduced slit widths and integration times. The HBr pressure was further increased to 270 torr over eight minutes and the emission fell to 25% of the original signal strength at 150 torr after 10 minutes. Appreciable $^1\Delta O_2$ emission was recorded for an additional sixteen minutes. The reaction product was a colorless solid.

EXAMPLE 3

Hydrogen Chloride-Barium Peroxide, HCl—$BaO_2$

A 700 mg sample of $BaO_2$ was added to the unthermostated cell described in Example 1 and was slowly pressurized at room temperature with hydrogen chloride gas to 420 torr over a 6 minutes period. The reaction cell was positioned with the window a few millimeters from the entrance slit of an 0.3 meter spectrograph with an InGaAs (−113 C) OMA mounted in the exit plane. The direct emission from singlet delta $O_2$ was not observed until 4 minutes later in the 1.27 micron region. Singlet delta oxygen emission signals persisted for another 12 minutes. The HCl/$BaO_2$ reaction was not violent. The cell was pumped out and recharged with HCl to 440 torr over a two minute period and no emission was observed during an additional 14 minutes. The solid reaction product was colorless and it resembled unreacted $BaO_2$.

EXAMPLE 4

Deuterium Chloride-Sodium Peroxide, DCl— $Na_2O_2$

A 400 mg sample of $Na_2O_2$ was added to the unthermostated cell described in Example 1 and was slowly pressurized at room temperature with deuterium chloride gas to 280 torr over a 15 minutes period. The singlet delta oxygen emission signal was detected after 6 minutes and continued to grow until the observation was terminated at 20 minutes. The gaseous contents of the cell were then condensed in a liquid nitrogen cold trap and DCl was added until the pressure reached 440 torr at 20 minutes. The maximum oxygen emission was obtained between 6 and 8 minutes at a total cell pressure of 100 to 200 torr. The gaseous contents of the cell were condensed at −77K and further addition of DCl resulted in larger oxygen emission signals at 1.27 microns. The cell was evacuated for 15 hours and a strong singlet delta oxygen emission signal was obtained when 120 torr of DCl was added. A colorless solid was recovered from the cell.

EXAMPLE 5

Deuterium Bromide-Sodium Peroxide, DBr— $Na_2O_2$

A 400 mg sample of sodium peroxide was added to the unthermostated cell described in Example 1 and was slowly pressurized to 230 torr with deuterium bromide over 6 minutes. Singlet delta oxygen emission was observed after 2 minutes. Condensing the gaseous contents of the cell into a liquid-nitrogen cooled trap and recharging the cell with fresh DBr yielded oxygen emission that grew over a 20 minutes observation period. A yellow solid was recovered from the cell.

EXAMPLES 6 and 7

Hydrogen Chloride-Lithium Peroxide, HCl—$Li_2O_2$, and Hydrogen Bromide-Lithium Peroxide, HBr— $Li_2O_2$ When the $Na_2O_2$ in examples 1 and 2 was replaced by $Li_2O_2$, comparable yields of singlet oxygen were obtained under the same reaction conditions.

As will be apparent to those skilled in the art, numerous modifications and variations of the present invention are possible in light of the above teaching. For example, the above examples have used a static gas fill system. However, for a continuous singlet oxygen generation process, a flow system obviously is the preferred choice. It is to be understood, therefore, that the invention may be practiced other than as specifically described herein within the scope of the appended claims.

What is claimed is:

1. A method for generating singlet delta oxygen at ambient temperature and without external energy sources, the method comprising a chemical reaction between a solid peroxide and a non-radioactive-hydrogen-isotope halide gas.

2. The method of claim 1 further comprising the use of a static gas fill system.

3. The method of claim 1 further comprising the use of a gas flow system.

4. The method of claim 1 further comprising its use in a chemical oxygen-iodine laser.

5. The method of claim 1 wherein said solid peroxide is an alkali metal peroxide.

6. The method of claim 1 wherein said solid peroxide is an alkaline earth peroxide.

7. The method of claim 1 wherein said non-radioactive-hydrogen-isotope halide gas is hydrogen chloride.

8. The method of claim 1 wherein said non-radioactive-hydrogen-isotope halide gas is hydrogen bromide.

9. The method of claim 1 wherein said non-radioactive-hydrogen-isotope halide gas is deuterium chloride.

10. The method of claim 1 wherein said non-radioactive-hydrogen-isotope halide gas is deuterium bromide.

11. The method of claim 5 wherein said solid alkali metal peroxide is sodium peroxide.

12. The method of claim 5 wherein said solid alkali metal peroxide is lithium peroxide.

13. The method of claim 6 wherein said alkaline earth peroxide is barium peroxide.

14. The method of claim 7 wherein said solid peroxide is lithium peroxide.

15. The method of claim 7 wherein said solid peroxide is sodium peroxide.

16. The method of claim 7 wherein said solid peroxide is barium peroxide.

17. The method of claim 8 wherein said solid peroxide is lithium peroxide.

18. The method of claim 8 wherein said solid peroxide is sodium peroxide.

19. The method of claim 8 wherein said solid peroxide is barium peroxide.

20. The method of claim 9 wherein said solid peroxide is lithium peroxide.

21. The method of claim 9 wherein said solid peroxide is sodium peroxide.

22. The method of claim 9 wherein said solid peroxide is barium peroxide.

23. The method of claim 10 wherein said solid peroxide is lithium peroxide.

24. The method of claim 10 wherein said solid peroxide is sodium peroxide.

25. The method of claim 10 wherein said solid peroxide is barium peroxide.

\* \* \* \* \*